United States Patent Office 3,642,810
Patented Feb. 15, 1972

3,642,810
PENICILLANIC ACID ESTERS
Peter Bamberg, Enhorna, Germany, and Bertil Åke Ekström, Berndt Olof Harald Sjöberg, and Lars Sölve Nathorst-Westfelt, Sodertalje, Sweden, assignors to Aktiebolaget Astra, Sodertalje, Sweden
No Drawing. Filed July 2, 1968, Ser. No. 741,839
Claims priority, application Great Britain, July 21, 1967, 33,734/67; Mar. 18, 1968, 13,102/68
Int. Cl. C07d 99/16
U.S. Cl. 260—239.1
9 Claims

ABSTRACT OF THE DISCLOSURE

A new class of compounds is disclosed which compounds are nitro- or halogen-substituted benzyl or monocarbocyclic arylsulphonylethyl esters of 6-aminopenicillanic acid. Methods for their preparation and conversion into penicillins are described.

The present invention relates to new 6-aminopencillanic acid esters, their preparation and their conversion into penicillins.

A great number of penicillins are known. Some of them may be prepared by fermentation processes, others may be prepared by acylation of 6-aminopenicillanic acid or by acylation of its esters. In the latter case the ester groups must be removed in a separate step to form the penicillin under conditions which do not affect the rest of the penicillin molecule. This route has certain advantages in that it allows the use of a great variety of acylating agents and the easy isolation and purification of the acylation product.

According to the present invention we provide new esters of 6-aminopenicillanic acid and penicillins and a method for their preparation from easily available starting material as well as a method for the conversion of said esters into penicillins.

Accordingly the invention provides compounds of the general formula

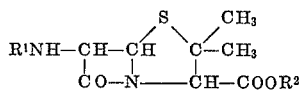

wherein $R^1$ is hydrogen, a monosubstituted acetyl group, like phenylacetyl, n-hexylacetyl, or phenoxyacetyl, which can be replaced with hydrogen by enzymatic hydrolysis or chemically, or an organic radical like triphenylmethyl or o-nitrophenylsulphenyl, which can be replaced with hydrogen chemically without destruction of the β-lactam-thiazolidine ring system, $R_2$ is nitro- or halogen-substituted benzyl or monocarbocyclic arylsulphonylethyl, and a method for their preparation and conversion to penicillins.

Examples of compounds of the general Formula I are:

p-nitrobenzyl 6-aminopenicillanate,
2'-(p-tosyl)-ethyl 6-aminopenicillanate,
2',6'-dichlorobenzyl 6-aminopenicillanate,
3',4'-dichlorobenzyl 6-aminopenicillanate,
2'-(phenylsulphonyl)-ethyl 6-aminopenicillanate,
2'-(m-chlorophenylsulphonyl)-ethyl 6-aminopenicillanate,
3',4'-dibromobenzyl 6-aminopenicillanate,
2',4',5'-trichlorobenzyl 6-aminopenicillanate,
3'-chlorobenzyl 6-aminopenicillanate,
4'-chlorobenzyl 6-aminopenicillanate,
p'-nitrobenzyl benzylpenicillinate,
p-nitrobenzyl phenoxymethylpenicillinate,
p'-nitrobenzyl heptylpenicillinate,
2',6'-dichlorobenzyl benzylpenicillinate,
2',4'-dichlorobenzyl phenoxymethylpenicillinate,
2'-(phenylsulphonyl) ethyl heptylpenicillnate,
2'-(p-tosyl) ethyl benzylpenicillinate,
p-nitrobenzyl p-chlorobenzylpenicillinate,
p-nitrobenzyl p-nitrobenzylpenicillinate,
2'-(p-tosyl)-ethyl o-nitrophenoxymethylpenicillinate,
p-nitrobenzyl pentylpenicillinate,
2',6'-dichlorobenzyl p-hydroxybenzylpenicillinate,
3',4'-dibromobenzyl benzylpenicillinate,
2',4',5'-trichlorobenzyl benzylpenicillinate,
3'-chlorobenzyl benzylpenicillinate,
2',6'-dichlorobenzyl 6-triphenylmethylaminopenicillanate,
p'-nitrobenzyl 6-(o-nitrophenylsulphenylamino)-penicillanate,
p'-nitrobenzyl-6-(triphenylmethylamino)-penicillanate,
4'-chlorobenzyl-6-triphenylmethylaminopenicillanate.

The process according to the present invention may be represented by the following reaction scheme:

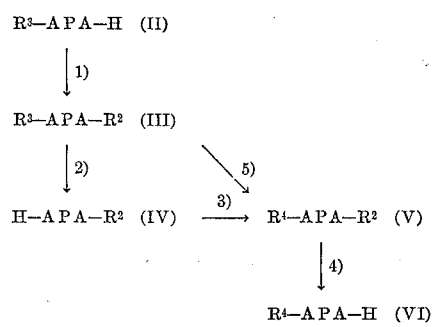

wherein $R^2$ has the same meaning as above, $R^3$ is a monosubstituted acetyl group, like phenylacetyl, n-hexylacetyl or phenoxyacetyl, which can be replaced with hydrogen by enzymatic hydrolysis or chemically, or an organic radical like triphenylmethyl, or o-nitrophenylsulphenyl, which can be replaced by hydrogen chemically without destruction of the β-lactam-thiazolidine ring system; $R^4$ is an aliphatic, cycloaliphatic, araliphatic, aromatic or heterocyclic radical which may be unsubstituted or substituted by one or more halogen atoms, alkyl, hydroxy, alkoxy, aryloxy, acyloxy, carboxy, carbethoxy, carboxamido, mercapto, alkylmercapto, nitro, amino and substituted amino groups or by alkyl- or arylsubstituted sulphoxy groups, especially a radical containing basic groups which cannot be masked by protecting groups such as tertiary amino- or imino groups especially those occurring in heterocycles, e.g. pyridine, quinoline, or thiazole, and —APA— is the residue

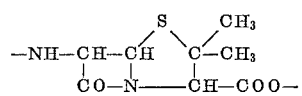

Examples of penicillins which may be prepared according to the process of the present invention are those described in British Pat. No. 877,120, such as α-phenoxy-butylpenicillin and α-phenoxy-propylpenicillin, in British Pat. No. 940,488, such as α-azido benzylpenicillin, in British Pat. No. 873,049, such as α-aminobenzyl-penicillin, in Australian patent application No. 53,509/64, such as α-(o-nitrophenylsulphenylamino)-benzylpenicillin, in Dutch patent application No. 6404384, such as α-carboxybenzylpenicillin, in South African Pat. No. 63/4,795, such as α-amino-p-hydroxybenzylpenicillin, in U.S. Pat. No. 3,322,751, i.e 6-(3'-methyl-4'-furazanylacetamido)-penicillanic acid, in U.S. Pat. No. 3,322,749, i.e. 6-(1,2,5-thiadiazolyl-3-acetamido)-penicillanic acid, in U.S. Pat. No. 3,322,750, such as 6-[α-(3-hydroxy-4-furazanyl) acetamido]-penicillanic acid and 6-[α-(3-methoxy-4-furazanyl) acetamido]-penicillanic acid, in Belgian Pat. No. 681,505, such as 6-(5-methyl-3-phenylisothiazolyl-4-carboxamido)-penicillanic acid, 6-[5-methyl-3-(2',6' - dichlorophenyl) isothiazolyl-4-carboxamido]-penicillanic acid and, 6 - (3 - p-methoxyphenyl-5-methylisothiazolyl-4-carboxamido)-penicillanic acid, in British Pat. No. 1,051,723, such as 6-[α-hydroxy-α-(3-pyridyl) acetamido]-penicillanic acid by R. Raap and R. G. Micetich in J. Med. Ch. 11 (1968), 70, such as 6-(4'-isothiazolyl-acetamide)-penicellanic acid, by P. Bamberg, B. Ekström and B. Sjöberg in Acta Chem. Scand. 21 (1967), 2210, such as 3-quinolylmethylpenicillin, 6-quinolylmethylpenicillin and 3-pyridylmethylpenicillin, by P. Bamberg, B. Ekström and B. Sjöberg, ibid. 22 (1968), 367 such as 5-thiazolymethylpenicillin, and by F. P. Doyle, J. C. Hanson, A. A. W. Long, J. H. C. Nayler and R. E. Stove in J. Chem. Soc. 1963, 5838 such as 6-(3-o-chlorophenyl-5-methylisoxazolyl-4-carboxamido)-penicillanic acid.

Step (1) may be carried out according to known methods. For instance a salt of the compound of the Formula II is reacted with the appropriate benzyl halide in an organic solvent as dimethylformamide, methyl isobutylketone or chloroform for 10–15 h. at a temperature below 25° C. Or a compound of the Formula II is reacted with the appropriate alcohol in the presence of a condensing agent as N,N'-dicyclohexylcarbodiimide, in an organic solvent as dimethylformamide, ethyl acetate, methylene chloride or methyl isobutylketone preferably at a temperature below 25° C. for 10–15 h. Step 1 may even be carried out by first transferring a compound of the Formula II into an acid chloride or a mixed anhydride, preferably one formed with an alkoxy formic acid and then reacting the anhydride with the appropriate alcohol.

In Step 2 the side chain $R^3$ is split off enzymatically or chemically. For instance, when $R^3$ is phenylacetyl the splitting is carried out using E. coli acylase, contained in a cell suspension or in an aqueous solution, When $R^3$ is phenoxy-acetyl the enzymatic cleavage is carried out using streptomyces acylase. In the enzymatic reaction water miscible organic solvents such as methanol, ethanol, isopropanol, acetone and dioxane are added to the reaction mixture to enhance the solubility of the penicillin ester. In a preferred form the enzymatic removal of the side chain from an ester of benzylpenicillin is done by treating the ester with E. coli acylase in an aqueous solution or suspension, containing 10–50%, preferably 15–30%, by weight of methanol, ethanol or acetone at a temperature of 20–45° C., preferably at 30–40° C. and at a pH of 6.5–9.0, preferably at pH 7–8. The reaction time is 0.5–8 hr., preferably 0.5–4 hr. The formed ester of 6-aminopenicillanic acid is extracted from the reaction mixture with organic solvents, such as ethyl acetate or ether. From such solutions the ester, if desired, can be precipitated in form of a salt with organic acids such as benzenesulphonic acid, or the ester in the solution can be acylated directly to give a penicillin ester. When $R^3$ is an acyl radical, e.g. phenylacetyl, hexylacetyl or phenoxyacetyl, the $R^3$—NH— moiety is an amide bond which is cleaved chemically by treating it with a halogenating agent, like phosphorus pentachloride, to convert it into an imino chloride, which is transformed into an imino ether by reaction with an alcohol and hydrolysed according to the method described in South African Pat. No. 67/2,927. When $R^3$ is triphenylmethyl the splitting is carried out chemically e.g. by using $CH_3$—$C_6H_5$—$SO_3H.H_2O$. When $R^3$ is o-nitrophenylsulphenyl the side chain is removed by treatment with aqueous acids under mild conditions preferably in the presence of nucleophilic agents such as sodium iodide, sodium thiosulphate or sodium thiocyanate (Acta Chem. Scand 19 (1965), 1245) or e.g. by treatment with thiophenols (Tetrahedron Letters (1966), 2985).

The acylation Step 3 may be carried out by known methods e.g. reacting the compound of the Formula IV with the appropriate acid chloride or its functional equivalent as an acylating agent for a primary amino group such as an acid azide, an acid bromide, an activated ester, an anhydride, a mixed anhydride, especially one formed with an alkoxy formic acid or with the appropriate acid in the presence of a condensing agent such as a carbodiimide or other compounds functioning in a similar way, such as N,N'-carbonyldiimidazole or N-ethyl-5-phenylisoxazolium-3'-sulphonate.

The acylation Reaction 3 may be carried out directly in the solution obtained in Step 2 without isolation of the compound of Formula IV. When $R^3$ is removed enzymatically the splitting and acylation reaction can be done simultaneously and combined into one single Step 5 by addition to the reaction mixture of an activated derivative containing the new side chain $R^4$. Examples of such activated derivatives are $R^4$—$SC_6H_5$ and $R^4$—S—$CH_2COOH$.

The cleavage of the ester linkage (Step 4) can be brought about by reaction with nucleophilic agents, e.g. sodium or potassium thiophenoxide in dimethylformamide or when $R^2$ is an arylsulphonylethyl also by treatment with $KOC(CH_3)_3$ or an aqueous base under mild conditions. When $R^2$ is substituted benzyl the cleavage can also be done hydrogenolytically.

The invention is further illustrated by the following examples:

EXAMPLE 1

2',6'-dichlorobenzyl benzylpenicillinate

A stirred mixture of potassium benzylpenicillinate (14.88 g., 0.04 mole) and 2,6-dichlorobenzylbromide (9.6 g., 0.04 mole) in dimethylformamide (80 ml.) was kept at 4° C. for 15 hours. After pouring into icewater (200 ml.) the product was extracted with ether, the ether phase washed with sodium bicarbonate and sodium chloride solution, dried and evaporated. The residue was crystallized from benzene, M.P. 133–5° C., strong IR-absorption at 1775 cm.$^{-1}$ corresponding to the β-lactam system. (Found (percent): C, 56.01; H, 4.66; Cl, 14.23; N, 5.55; O, 12.98; S, 6.67. Calcd. for $C_{23}H_{22}Cl_2N_2O_4S$ (percent): C, 55.99; H, 4.50; Cl, 14.37; N, 5.68; O, 12.97; S, 6.50).

The following products were prepared in the same way:

2',4'-dichlorobenzyl benzylpenicillinate. Starting with potassium benzylpenicillinate and 2,4-dichlorobenzylchloride, M.P. 126–8° C., IR-absorption at 1765 cm.$^{-1}$. (Found (percent): C, 55.79; H, 4.59; Cl, 14.33; N, 5.65; O, 13.15; S, 6.55. Calcd. for $C_{23}H_{22}Cl_2N_2O_4S$ (percent): C, 55.99; H, 4.50; Cl, 14.37; N, 5.68; O, 12.97; S, 6.50).

3',4'-dichlorobenzyl benzylpenicillinate: Starting with potassium benzylpenicillinate and 3,4-dichlorobenzylchloride; the product was obtained as an oil, IR-absorption 1755 cm.$^{-1}$.

m-Chlorobenzyl benzylpenicillinate: Starting with potassium benzylpenicillinate and m-chlorobenzylchloride, IR-absorption at 1770 cm.$^{-1}$.

p - Chlorobenzyl benzylpenicillinate: Starting with potassium benzylpenicillinate and p - chlorobenzylbromide, IR-absorption at 1770 cm.$^{-1}$.

4' - nitrobenzyl benzylpenicillinate: Starting with potassium benzylpenicillinate and 4-nitrobenzylbromide; the product was obtained as an oil, IR-absorption at 1775 cm.$^{-1}$.

EXAMPLE 2

2-p-tosylethyl benzylpenicillinate

To a stirred ice-cooled solution of benzylpenicillin (37.2 g., 0.1 mole) and 2-p-tosylethanol (13.2 g., 0.066 mole) in dry tetrahydrofuran (100 ml.) N,N'-dicyclohexylcarbodiimide (13.6 g., 0.066 mole) in dry tetrahydrofuran (50 ml.) was added dropwise in the course of about 30 min. After 15 h. at +4° C. ethyl acetate (150 ml.) was added and the precipitated N,N'-dicyclohexylurea was removed by filtration. The filtrate was washed successively with saturated sodium bicarbonate solution and brine, dried and evaporated leaving 35 g. of an oily residue. This was dissolved in dry benzene and passed through a column containing neutral aluminium oxide "Woelm, activity grade 1" (from M. Woelm, Eschwege, Germany). Then the solution was charcoaled and evaporated. The residue, 27 g., was taken up in a little benzene and the product precipitated by the addition of petroleum ether, yield 15.9 g., M.P. 49° C., IR-absorption 1775 cm.$^{-1}$. A part of the product (1.0 g.) was dissolved in dimethylformamide (1.5 ml.) containing potassium thiophenoxide (0.29 g.). After 30 min. at room temperature the solution was poured into acetone/ether 1/1 (30 ml.) whereby potassium benzylpenicillinate (0.5 g.) precipitated, purity 89.2%.

EXAMPLE 3

N-triphenylmethyl-2-p-toluenesulphonylethyl-6-aminopenicillanate

To a stirred ice cold suspension of N-triphenylmethyl-6-aminopenicillanic acid (4.6 g., 0.01 mole) and 2-p-toluenesulphonylethanol (2.0 g., 0.01 mole) in acetonitrile (10 ml.) was added during 30 min. a solution of N,N'-dicyclohexylcarbodiimide (2.1 g., 0.01 mole) in acetonitrile (3 ml.). Stirring was continued for another 5 hours, ethyl acetate (50 ml.) was added and the precipitated N,N'-dicyclohexylurea removed by filtration. The filtrate was washed with saturated NaHCO$_3$ and NaCl solution. After drying and evaporation the organic layer yielded 5.8 g. (89%) of N-triphenylmethyl-2-p-toluenesulphonylethyl-6 - aminopenicillanate, showing strong IR - absorption bands at 1785 (C=O, β-lactam) 1750 (C=O, ester) and 1150 cm.$^{-1}$ (SO$_2$).

*Analysis.*—Found (percent): C, 67.22; H, 5.73; N, 4.28; O, 12.63; S, 10.14. Calculated for C$_{36}$H$_{37}$N$_2$O$_5$S$_2$ (percent): C, 67.4; H, 5.77; N, 4.37; O, 12.5; S, 10.0.

EXAMPLE 4

Benzenesulphonic acid salt of the p-nitrobenzylester of 6-aminopenicillanic acid (a) To a stirred suspension of *Escherichia coli* cells in water (500 ml.) containing 19500 units of acylase [1] at pH 7.8 p-nitrobenzyl benzylpenicillinate (2.25 g.) in acetone (100 ml.) and water (50 ml.) was added. After 4 hours at 35° C. during which time the pH was kept at 7.8 by addition of 0.5 N NaOH the mixture was cooled and extracted with ether (500+250 ml.). The organic layer was separated and centrifuged in order to separate water and bacterial mass.

After drying and chilling the ether phase, containing the p-nitrobenzyl 6-aminopenicillanate, benzenesulphonic acid (600 mg.) in actone (20 ml.) was added with stirring. The precipitate (1.15 g.) was collected by filtration. A second crop (300 mg.) crystallized after addition of another quantity of benzenesulphonic acid (100 mg.) in acetone (10 ml.) and standing overnight at +4° C. IR absorption at 1760 cm.$^{-1}$ (β-lactam).

*Analysis.*—Found (percent): C, 49.67; H, 4.66; N, 8.09; O, 25.03; S, 12.66. Calculated for C$_{21}$H$_{23}$N$_3$O$_8$S$_2$ (percent): C, 49.50; H, 4.55; N, 8.23; O, 25.12; S, 12.59.

(b) To a stirred solution of *E. coil* penicillin acylase in water (240 ml.) and methanol (30 ml.) containing 5050 units of acylase at pH 7.8 p-nitrobenzyl benzyl penicillinate (1.0 g.) in methanol (30 ml.) was added. After 2 hours at 35° C. during which time the pH was kept at 7.8 by addition of 0.1 N NaOH the mixture was cooled and extracted with ethyl acetate (300 ml.). The organic layer was separated, dried over sodium sulphate,

[1] Acylase unit corresponds to the amount of bacterial cells capable of splitting in 1.5 hours at pH 7.8 and 37° C. an amount of benzylpenicillin equivalent to 1 mg. of 6-aminopenicillanic acid.

concentrated in vacuo at 30° C., diluted with dry ether (200 ml.) and treated with benzenesulphonic acid. (300 mg.) in acetone (15 ml.), to precipitate the benzenesulphonic acid salt of p-nitrobenzyl-6-aminopenicillanate (0.4 g.).

(c) p - Nitrobenzyl - benzylpenicillinate (4.7 g., 0.01 mole) was dissolved in dry methylene chloride (50 ml.) and treated at room temperature with a 10% solution of triethyloxonium fluoborate in methylene chloride (20 ml., 0.01 mole). After 3 hours pyridine (0.5 ml.) was added and the methylene chloride was removed in vacuo at room temperature. The residue was dissolved in 50% dioxane (50 ml.) and adjusted to pH 3. After standing overnight at 4° C. the mixture was adjusted to pH 8.5 and extracted with ethyl acetate three times. The combined organic extracts were washed with brine and dried over anhydrous Na$_2$SO$_4$. To the filtered, dry solution benzenesulphonic acid (0.5 g.) in acetone (20 ml.) was added and the solvent evaporated in vacuo. Triturating the residue with acetone-ether (1:1) gave the benzenesulphonic salt of p - nitro - benzyl - 6 - aminopenicillanate (0.5 g.).

The product was identified by comparison of its IR-spectrum with that of the product of Example 4a.

(d) p - Nitrobenzyl - benzylpenicillinate (4.1 g., 0.01 mole) and pyridine (0.8 g., 0.01 mole) were dissolved in dry methylene chloride (140 ml.) and treated with phosphorus pentachloride (2.1 g., 0.01 mole), while stirring at −25° C. After 2 hours propanol (25 ml.) was added to the reaction solution and the temperature was allowed to rise to −20° C. After stirring for further 2 hours at this temperature the slightly yellow reaction solution was poured into 25 ml. of water, the resulting mixture being stirred and cooled in an ice bath and kept at pH 3 by addition of 2 N sodium hydroxide (17 ml.). Stirring was continued for 90 minutes and then the mixture was kept at 4° C. overnight. The pH of the mixture was adjusted to 8.5 and the organic phase was separated. The aqueous phase was extracted with methylene chloride. The combined organic phases were washed with brine and water and dried over anhydrous magnesium sulphate. Evaporation of the solvent in vacuo at room temperature gave a residue (3.2 g.) containing the p-nitrobenzyl-6-aminopenicillanate.

Half of the product was dissolved in ethyl acetate (3 ml.) and treated with benzenesulphonic acid (0.25 g.) in acetone (10 ml.). The solvent was removed in vacuo and the residue triturated with ether to give 1 g. of the benzenesulphonic acid salt of p-nitrobenzyl-6-aminopenicillanate.

2',6' - dichlorobenzyl - 6 - aminopenicillanate: In the manner described in the preceding Example 4d the 2',6' - dichlorobenzyl - 6 - aminopenicillanate was prepared from 2',6'-dichlorobenzyl-benzylpenicillinate.

EXAMPLE 5

Benzenesulphonic acid salt of 2'-p-tosyl-ethyl 6-aminopenicillanate 2-p-tosyl-ethyl benzylpenicillinate (12.2 g.) in acetone (250 ml.) and water (100 ml.) was added to a stirred bacterial cell suspension (900 ml., containing 38,000 units of acylase). After 140 min. the mixture was cooled, extracted with ethyl acetate (500 ml.) and dried.

Benzenesulphonic acid (2 g.) in acetone (30 ml.) was added to the organic extract and the solution chilled to +4° C. for 15 hours. The crystalline precipitate of 2-p-tosyl-ethyl 6-aminopenicillanate benzenesulphonic acid salt was collected by filtration. (IR absorption at 1790 cm.$^{-1}$.)

EXAMPLE 6 p-Toluenesulphonic acid salt of 2-p-toluenesulphonyl-ethyl-6-aminopenicillanate

The product obtained in Example 3 was dissolved in acetone (12 ml.) containing p-toluenesulphonic acid (1.7 g., 0.009 mole) and left 30 min. at room temperature. Dry ether (100 ml.) was added and the precipitating product collected by filtration and washed thoroughly with ether. Yield 4.56 g. (88%), decomposition >110° C.

Analysis.—Found (percent): C, 50.46; H, 5.39; N, 5.08; O, 22.37; S, 16.75; Calculated for $C_{24}H_{30}N_2O_8S_3$ (percent): C, 50.45; H, 5.25; N, 4.91; O, 22.42; S, 16.82.

EXAMPLE 7

2',6'-dichlorobenzyl 6-aminopenicillanate benzenesulphonic acid salt

To a stirred suspension of E. coli cells in water (1200 ml.) and methanol (200 ml.) containing 22,500 units of acylase at 35° C. 2',6'-dichlorobenzyl benzylpenicillinate (5 g., 0.0101 mole) dissolved in methanol (100 ml.) was added while the pH was maintained at 7.8 with 0.5 N sodium hydroxide. After 135 minutes 0.01025 mole of base had been consumed. The mixture was cooled and extracted with ethyl acetate (1000 ml.). The organic phase was centrifuged, dried and evaporated to about 50 ml., benzenesulphonic acid (1.58 g.) in acetone (20 ml.) was added while chilling. After the addition of ether the product precipitated. IR-absorption at 1780 cm.$^{-1}$ ($\beta$-lactam C=O).

The same product was obtained when performing the reaction in a water/acetone mixture instead of the water/methanol mixture. The reaction time was 136 minutes, 0.00725 mole of sodium hydroxide were consumed.

In an analogous way the following esters of 6-aminopenicillanic acid were prepared from the corresponding esters of benzylpenicillins,

| Ester | Amount of ester (mole) | Base consumed (mole) | Reaction time (min.) |
| --- | --- | --- | --- |
| 2',4'-dichlorobenzyl | 0.02 | 0.0173 | 115 |
| 3',4'-dichlorobenzyl | 0.02 | 0.0150 | 150 |

EXAMPLE 8

Potassium 3-pyridylmethylpenicillinate

A solution of p-nitrobenzyl 6-aminopenicillanate (3.51 g.) in ether (800 ml.) was prepared as described in Example 4a. A part of the ether (700 ml.) was evaporated, the solution chilled to 0–4° C. and 3-pyridylacetic acid (1.7 g.) was added followed by N, N'-dicyclohexylcarbodiimide (2.1 g.) in methylene chloride (10 ml). After stirring at 4° C. for 15–20 hours the dicyclohexylurea was removed by filtration. The filtrate was washed with sodium chloride solution and dried. The solvent was evaporated. Potassium thiophenoxide (1.4 g.) in dimethylformamide (3 ml.) was added to the residue dissolved in dimethylformamide (8 ml.). After 30 min. at room temperature the solution was poured into dry ether (150 ml.) and the precipitated potassium 3-pyridylmethylpenicillinate was collected by filtration. (IR absorption at 1775 cm.$^{-1}$, minimum inhibitory concentration against Staphylococcus aureaus Oxford 0.03 mcg./ml.).

EXAMPLE 9

Potassium 3-pyridylmethylpenicillinate

To a stirred suspension of Eschericia coil cells in water (410 ml.) containing 15,000 units acylase at pH 7.5 solutions, preadjusted to the same pH-value of 2-p-toluenesulphonylethyl benzylpenicillinate (3.4 g.) in acetone (90 ml.) and water (50 ml.) and of the thiophenylester of 3-pyridylacetic acid (1.5 g.) in 50% acetone (30 ml.), were added. After 5 hours at 35° C. during which time the pH was kept at 7.5 by addition of 0.5 N NaOH the mixture was cooled and extracted with ether (400 ml.). The mixture was centrifuged and the organic layer separated, dried and concentrated in vacuo to dryness.

The residue dissolved in dimethylformamide (2 ml.) was treated with potassium thiophenolate (1 g.), dissolved in dimethylformamide (5 ml.). After 30 min. at room temperature water (25 ml.) was added and the mixture was neutralized, washed with ether and freeze-dried to give the potassium salt of 3-pyridylmethylpenicillin (2 g., purity 45%).

EXAMPLE 10

Potassium 3-pyridylmethylpenicillinate

2',6'-dichlorobenzyl benzylpenicillinate (4 g.) in methanol (160 ml.) was added to a stirred suspension of E. coli cells in water (1000 ml.) and methanol (130 ml.) containing 20,480 units of acylase at pH 7.8. After 125 min. at 35° C. during which time the pH was maintained at 7.8 by addition of 0.5 N NaOH the mixture was cooled and extracted with ethyl acetate. After centrifuging and drying the organic layer 3-pyridylacetic acid (1.1 g.) was added. Then the mixture was ice chilled and stirred while N,N'-dicyclohexylcarbodiimide (1.67 g.) in methylene chloride (10 ml.) was added dropwise. After stirring for 15 hours at +4° C. the precipitated N,N'-dicyclohexylurea was removed and the filtrate was washed with water, dried and the solvent evaporated. The residue (6.2 g.) was reprecipitated from benzene/petroleum ether yielding 2.9 g. of 2',6'-dichlorobenzyl 3-pyridylmethylpenicillinate. (Found (percent): C, 53.45; H, 4.45; N, 8.48; O, 13.13; S, 6.42; Cl, 14.18. Calcd. for $C_{22}H_{21}Cl_2N_3O_4S$ (percent): C, 53.45; H, 4.18; N, 8.50; O, 12.94; S, 6.49; Cl, 14.34. 2.4 g. thereof in dimethylformamide (4 ml.) were treated with potassium thiophenozide (0.75 g.) for 45 min. at room temperature. Then the mixture was poured into dry acetone yielding the potassium 3-pyridylmethylpenicillinate (purity 56%).

EXAMPLE 11

Potassium α-phenoxypropylpenicillinate was prepared as described in Example 8 starting from 2-p-tosyl-ethyl 6-aminopenicillanate (3.98 g.) in ethyl acetate, prepared as described in Example 5, α-phenoxybutyric acid (3.26 g.) and N,N'-dicyclohexylcarbodiimide (2.1 g.).

EXAMPLE 12

6-[D-α-azidophenylacetamide]-penicillanic acid

To a stirred suspension of Escherichia coli cells (300 g.) in water (1500 ml.) and methanol (350 ml.) containing 38,400 units of penicillin acylase, p-nitrobenzyl benzylpenicillinate (7.2 g., 0.015 mole) in methanol (100 ml.) was added at 35° C. The pH of the reaction mixture was kept at 7.8 by gradual addition of 0.5 N sodium hydroxide. After 80 min. the reaction mixture was cooled and extracted with ethyl acetate (2000 ml.). The combined organic layers (1330 ml.) were dried over anhydrous sodium sulphate for 30 min. at room temperature.

To 530 ml. of this solution containing p-nitrobenzyl-6-aminopenicillanate (2.1 g., 0.006 mole) and chilled in an ice bath triethylamine (0.67 g., 0.0066 mole) was added, followed by D-α-azidophenylacetyl chloride (2.9 g., 0.066 mole), dissolved in trichloroethylene (13 ml.). After 2 hours the mixture was washed well with water, dried and concentrated in vacuo at room temperature. The oily residue was triturated with petroleum ether to give the solid p-nitrobenzyl 6-[D-α-azidophenylacetamido] penicillanate (1 g.). This was dissolved in dry dimethylformamide (10 ml.) and treated with potassium thiophenoxide (0.29 g.) for 30 min. at room temperature. The mixture was poured into dry, ice-cooled ether (200 ml.) and the precipitated potassium salt of 6-[D-α-azidophenylacetamide] penicillanic acid (0.7 g.) was collected by filtration and dried.

EXAMPLE 13

Phenoxymethylpenicillin p-Nitrophenyl ester of phenoxyacetic acid (2.2 g., 0.0083 mole) and triethylamine (0.83 g., 0.0083 mole) were added to a solution of 2'-p-tosylethyl-6-aminopenicillanate (3.3 g., 0.0083 mole) in ethyl acetate (800 ml.), obtained as described in Example 5. The mixture was stirred overnight at room temperature and then washed with 0.1 M citric acid, water, dilute alkali at pH 10 and finally with water. The organic layer was dried and concentrated in vacuo at 30° C. to give 2'-p-tosyl-ethyl-phenoxymethylpenicillinate (5.5 g.) as an oily residue. This was dissolved in dimethylformamide (10 ml.) and treated with potassium thiophenoxide (1.2 g., 0.0083 mole) for 30 min. at room temperature. The mixture was poured into dry ether (150 ml.) and the precipitated potassium salt of phenoxymethylpenicillin (2 g.) was collected by filtration and dried.

EXAMPLE 14

Isobutoxymethylpenicillin

Isobutoxy-acetic acid (0.87 g., 0.0066 mole) and triethylamine (0.67 g., 0.0066 mole) were dissolved in dry ethyl acetate and treated, while stirring at —5° C., with ethyl chloroformate (0.75 g., 0.0066 mole). After 15 min. the mixture was added to a stirred and ice-cooled solution of p-nitrobenzyl-6-aminopenicillanate (2.1 g., 0.0066 mole) in ethyl acetate (530 ml.), obtained as described in Example 4a. After stirring for one hour in the ice bath and for another one at room temperature the reaction mixture was washed well with water, dried and concentrated in vacuo at room temperature. The oily residue was triturated with petroleum ether to give the solid p-nitrobenzyl isobutoxymethylpenicillinate (0.65 g.). This was dissolved in dry dimethylformamide (5 ml.) and treated with potassium thiophenoxide (0.21 g.) for 30 min. at room temperature. The reaction mixture was poured into dry, ice-cooled ether (100 ml.) and the precipitated potassium salt of isobutoxymethylpenicillin (0.2 g.) was collected by filtration and dried.

What we claim is:

1. A compound of the general formula

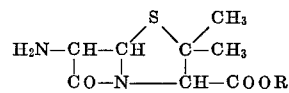

wherein R is selected from the group consisting of nitro-substituted benzyl, halogen-substituted benzyl and monocarboxyclic arylsulphonylethyl.

2. A compound according to claim 1, wherein $R^2$ is p-nitrobenzyl.
3. A compound according to claim 1, wherein $R^2$ is 2,6-dichlorobenzyl.
4. A compound according to claim 1, wherein $R^2$ is p-chlorobenzyl.
5. A compound according to claim 1, wherein $R^2$ is m-chlorobenzyl.
6. A compound according to claim 1, wherein $R^2$ is 2,4-dichlorobenzyl.
7. A compound according to claim 1, wherein $R^2$ is 3,4-dichlorobenzyl.
8. A compound according to claim 1, wherein $R^2$ is p-toluenesulphonylethyl.
9. A compound according to claim 1, wherein $R^2$ is benzenesulphonylethyl.

References Cited

UNITED STATES PATENTS

| | | | |
|---|---|---|---|
| 3,173,911 | 3/1965 | Hoover | 260—239.1 |
| 3,406,185 | 10/1968 | Patchett et al. | 260—239.1 |
| 3,454,557 | 7/1969 | Patchett et al. | 260—239.1 |

NICHOLAS S. RIZZO, Primary Examiner

U.S. Cl. X.R.

260—239.1

20224

PJ-1050
(5/69)

UNITED STATES PATENT OFFICE
CERTIFICATE OF CORRECTION

Patent No. 3,642,810          Dated February 15, 1972

Inventor(s) Peter Bamberg, Bertil Ake Ekstrom, Berndt Olof Harald Sjoberg and Lars Solve Nathorst-Westfelt It is certified that error appears in the above-identified patent and that said Letters Patent are hereby corrected as shown below:

Column 1, line 53, "$R_2$" should be --$R^2$--;
Column 2, line 2, "heptylpenicillnate" should be --heptylpenicillinate--;
Column 3, line 12, "acetamide" should be --acetamino--;
Column 4, line 6, "especilly" should be --especially--;
Column 5, line 55, "actone" should be --acetone--;
Column 5, line 64, "coil" should be --coli--;
Column 7, line 60, "aureaus" should be --aureus--;
Column 7, line 64, "Eschericia" "coil" should be --Escherichia-- and --coli--;
Column 8, line 26, "53.45" should be --53.44--;
Column 8, line 31, "thiophenozide" should be --thiophenoxide--;
Column 8, line 43, "azidophenylacetamide" should be --azidophenylacetamido--;
Column 8, line 69, "azidophenylacetamide" should be --azidophenylacetamido--;
Column 10, lines 10, 12, 14, 16, 18, 20, 22 and 24, "$R^2$" should be --R--.

Signed and sealed this 29th day of August 1972.

(SEAL)
Attest:

EDWARD M. FLETCHER, JR.          ROBERT GOTTSCHALK
Attesting Officer          Commissioner of Patents